(12) United States Patent
Tanaka et al.

(10) Patent No.: US 11,314,243 B2
(45) Date of Patent: Apr. 26, 2022

(54) FAILURE PREDICTION SUPPORT DEVICE, FAILURE PREDICTION SUPPORT METHOD AND FAILURE PREDICTION SUPPORT PROGRAM

(71) Applicant: OMRON Corporation, Kyoto (JP)

(72) Inventors: Keizo Tanaka, Kyoto (JP); Haruna Shimakawa, Kyoto (JP); Katsushige Ohnuki, Kyoto (JP)

(73) Assignee: OMRON Corporation, Kyoto (JP)

( * ) Notice: Subject to any disclaimer, the term of this patent is extended or adjusted under 35 U.S.C. 154(b) by 691 days.

(21) Appl. No.: 16/251,079

(22) Filed: Jan. 18, 2019

(65) Prior Publication Data

US 2019/0286117 A1 Sep. 19, 2019

(30) Foreign Application Priority Data

Mar. 13, 2018 (JP) .............................. JP2018-045998

(51) Int. Cl.
*G05B 23/02* (2006.01)
*G05B 17/02* (2006.01)
(Continued)

(52) U.S. Cl.
CPC ......... *G05B 23/0283* (2013.01); *G05B 17/02* (2013.01); *G05B 19/058* (2013.01);
(Continued)

(58) Field of Classification Search
CPC ............ G05B 23/0283; G05B 23/0221; G05B 19/4065; G05B 17/02; G05B 23/0235; G05B 23/0272
See application file for complete search history.

(56) References Cited

U.S. PATENT DOCUMENTS 5,062,711 A * 11/1991 Brown .................. G01N 21/88
356/240.1
7,593,837 B2 * 9/2009 Nakaya .................. G05B 17/02
703/6

(Continued)

FOREIGN PATENT DOCUMENTS

CN 101641583 2/2010
CN 102156447 8/2011
(Continued)

OTHER PUBLICATIONS

"Search Report of Europe Counterpart Application", dated Aug. 7, 2019, pp. 1-8.

(Continued)

*Primary Examiner* — Bryan Bui
(74) *Attorney, Agent, or Firm* — JCIPRNET

(57) ABSTRACT

Provided are a failure prediction support device, a failure prediction support method, and a failure prediction support program, by which a user can easily know an abnormality in time series data relating to an apparatus. The failure prediction support device includes: a difference detection part, acquiring actual machine time series data being time series data relating to control of an apparatus and simulation time series data being time series data relating to control of the simulated apparatus, and detecting a difference between the actual machine time series data and the simulation time series data; a determination part, determining whether or not the difference satisfies a condition predetermined in relation to an abnormality in the actual machine time series data; and a notification processing part, notifying that the difference has been detected when it is determined that the difference satisfies the condition.

10 Claims, 13 Drawing Sheets

(51) Int. Cl.
 *G05B 19/4065* (2006.01)
 *G05B 19/05* (2006.01)
 *G05B 19/042* (2006.01)

(52) U.S. Cl.
 CPC ..... *G05B 19/4065* (2013.01); *G05B 23/0221* (2013.01); *G05B 23/0235* (2013.01); *G05B 23/0243* (2013.01); *G05B 23/0267* (2013.01); *G05B 23/0272* (2013.01); *G05B 19/0428* (2013.01)

(56) References Cited

U.S. PATENT DOCUMENTS

| | | |
|---|---|---|
| 2005/0240382 A1 | 10/2005 | Nakaya et al. |
| 2007/0043539 A1 | 2/2007 | Niina et al. |
| 2015/0213706 A1 | 7/2015 | Bai et al. |

FOREIGN PATENT DOCUMENTS

| | | |
|---|---|---|
| JP | H01180098 | 7/1989 |
| JP | H0778005 | 3/1995 |
| JP | H07160326 | 6/1995 |
| JP | H08314530 | 11/1996 |
| JP | H10254533 | 9/1998 |
| JP | H113120 | 1/1999 |
| JP | 2000010620 | 1/2000 |
| JP | 2005332360 | 12/2005 |
| JP | 2006323538 | 11/2006 |
| JP | 2011186517 | 9/2011 |
| JP | 2014048697 | 3/2014 |

OTHER PUBLICATIONS

"Office Action of Japan Counterpart Application" with English translation thereof, dated Feb. 9, 2021, p. 1-p. 7.
"Office Action of China Counterpart Application" with English translation thereof, dated Sep. 3, 2021, p. 1-p. 27.

\* cited by examiner

| Variable | Permissible error | Number of determination points | Establishment count | Establishment count detection period | Message |
|---|---|---|---|---|---|
| Axis 1. Position | 10% | 20 points | 2 times | 100 cycles | Please check the motor. |
| Axis 2. Torque | 10% | 50 points | 3 times | 1000ms | Please check the speed reducer. |
| ... | ... | ... | ... | ... | ... |

FIG. 4

| Variable | Permissible error | Number of determination points | Establishment count | Establishment count detection period | Message |
|---|---|---|---|---|---|
| Axis 1. Position | 10% | 20 points | 2 times | 100 cycles | Please check the motor. |
| ... | ... | ... | ... | ... | ... |

FIG. 10

| Variable | Permissible error | Number of determination points | Establishment count | Establishment count detection period | Message |
|---|---|---|---|---|---|
| Axis 1. Position | 10% | 20 points | 2 times | 100 cycles | Please check the motor. |
| Axis 2. Torque | 10% | 50 points | 3 times | 1000ms | Please check the speed reducer. |
| ... | ... | ... | ... | ... | ... |

FIG. 12

FAILURE PREDICTION SUPPORT DEVICE, FAILURE PREDICTION SUPPORT METHOD AND FAILURE PREDICTION SUPPORT PROGRAM

CROSS-REFERENCE TO RELATED APPLICATION

This application claims the priority benefit of Japan Application No. 2018-045998, filed on Mar. 13, 2018. The entirety of the above-mentioned patent application is hereby incorporated by reference herein and made a part of this specification.

BACKGROUND

Technical Field

The disclosure relates to a failure prediction support device, a failure prediction support method and a failure prediction support program.

Related Art

A controller such as a programmable logic controller (PLC) or the like controls an apparatus installed on a factory line based on a program. The controller can record a change in variable data used in the program as time series data relating to control of the apparatus. In addition, a user may predict a failure in the apparatus based on such time series data.

PATENT DOCUMENTS

Patent Document 1: Japanese Laid-open No. H08-314530

In order to predict a failure in an apparatus, it is necessary to know abnormality in time series data. However, since a change in the time series data that shows abnormality is complicated, even if the time series data shows an abnormality, it was difficult for the user to know the abnormality at once.

SUMMARY

The disclosure provides a failure prediction support device, a failure prediction support method, and a failure prediction support program, by which the user can easily know an abnormality in the time series data relating to control of the apparatus.

According to an aspect of the disclosure, a failure prediction support device is provided, including: a difference detection part, acquiring actual machine time series data being time series data relating to control of an apparatus and simulation time series data being time series data relating to control of the simulated apparatus, and detecting a difference between the actual machine time series data and the simulation time series data; a determination part, determining whether or not the difference satisfies a condition predetermined in relation to an abnormality in the actual machine time series data; and a notification processing part, notifying that the difference has been detected when it is determined that the difference satisfies the condition.

BRIEF DESCRIPTION OF THE DRAWINGS

FIG. 4 illustrates an example of condition data.

FIG. 10 illustrates a display example of a condition setting image in which condition data are registered for a variable.

FIG. 12 illustrates a display example of a condition setting image in which condition data are registered for a plurality of variables.

DESCRIPTION OF THE EMBODIMENTS

Figure 1:
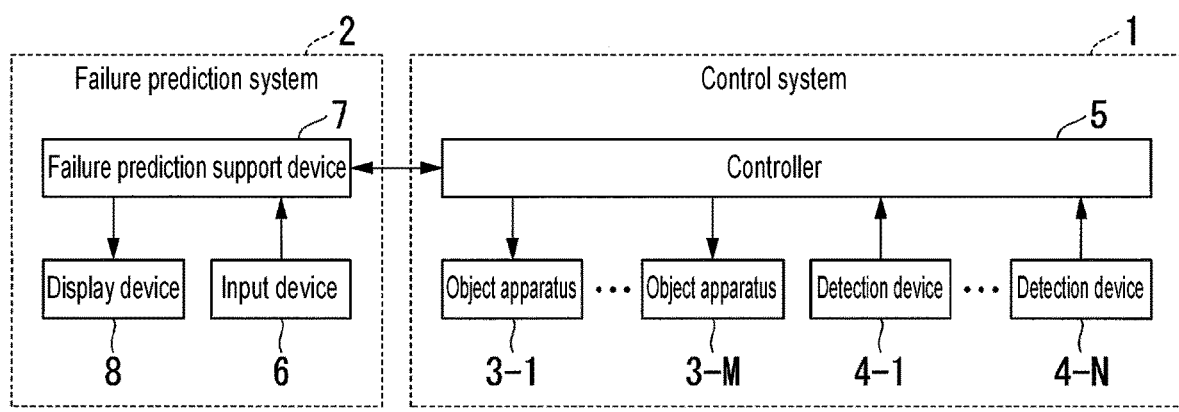
FIG. 1 illustrates an example of a configuration of a control system and a failure prediction system.

According to an aspect of the disclosure, in the failure prediction support device, a synchronization processing part synchronizing the actual machine time series data and the simulation time series data with each other is further included, and the difference detection part detects the difference between the synchronized actual machine time series data and simulation time series data.

According to an aspect of the disclosure, in the failure prediction support device, the difference detection part records the actual machine time series data and the simulation time series data in a memory device.

According to an aspect of the disclosure, in the failure prediction support device, a condition acquisition part acquiring data indicating the condition is further included.

According to an aspect of the disclosure, in the failure prediction support device, the condition acquisition part further acquires a message being a character string including characters arbitrarily designated by a user, and the notification processing part further notifies with a message for each of the difference.

According to an aspect of the disclosure, a failure prediction support method is provided, the failure prediction support method being executed by an information processing device and including the following steps. Actual machine time series data being time series data relating to control of an apparatus and simulation time series data being time series data relating to control of the simulated apparatus are acquired, and a difference between the actual machine time series data and the simulation time series data is detected. Whether or not the difference satisfies a condition predetermined in relation to an abnormality in the actual machine time series data is determined. When it is determined that the difference satisfies the condition, the fact that the difference has been detected is notified.

According to an aspect of the disclosure, a failure prediction support program is provided for a computer to execute: a procedure for acquiring actual machine time series data being time series data relating to control of an apparatus and simulation time series data being time series data relating to control of the simulated apparatus, and detecting a difference between the actual machine time series data and the simulation time series data; a procedure for determining whether or not the difference satisfies a condition predetermined in relation to an abnormality in the actual machine time series data; and a procedure for notifying that the difference has been detected when it is determined that the difference satisfies the condition.

According to an aspect of the disclosure, a failure prediction support device is provided, including: an acquisition part, acquiring actual machine time series data being time series data relating to control of an apparatus and simulation time series data being time series data relating to control of the simulated apparatus; and an image generation part causing a display device to display a variable value relating to the actual machine time series data and a variable value relating to the simulation time series data in a comparable manner.

According to an aspect of the disclosure, a failure prediction support method is provided, the failure prediction support method being executed by an information processing device and including the following steps. Actual machine time series data being time series data relating to control of an apparatus and simulation time series data being time series data relating to control of the simulated apparatus are acquired. A display device is caused to display a variable value relating to the actual machine time series data and a variable value relating to the simulation time series data in a comparable manner.

According to an aspect of the disclosure, a failure prediction support program is provided for a computer to execute: a procedure for acquiring actual machine time series data being time series data relating to control of an apparatus and simulation time series data being time series data relating to control of the simulated apparatus; and a procedure for causing a display device to display a variable value relating to the actual machine time series data and a variable value relating to the simulation time series data in a comparable manner.

According to the disclosure, the user can easily know an abnormality in time series data relating to control of an apparatus.

An embodiment of the disclosure is explained in detail with reference to the drawings.

FIG. 1 illustrates an example of a configuration of a control system 1 and a failure prediction system 2. The control system 1 is a system controlling an apparatus (hereinafter referred to as "object apparatus") predetermined as a control object. The control system 1 includes detection devices 4-1 to 4-N (N is an integer of 1 or greater), object apparatuses 3-1 to 3-M (M is an integer of 1 or greater), and a controller 5. In the following, N is equal to M in order to simplify the explanation.

Operation of an object apparatus 3 is controlled by the controller 5. The object apparatus 3 is, for example, a robot arm, or a belt conveyor. The object apparatus 3 is installed on, for example, a factory line.

A detection device 4-$n$ ($n$ is an integer from 1 to N) is a sensor device detecting a state of an object apparatus 3-$m$ ($m$ is an integer from 1 to M and is an integer equal to $n$), and is, for example, a photoelectric sensor, a displacement sensor, or an encoder. A detection device 4 detects, for example, the position and torque of the object apparatus 3-$m$. For example, the position refers to a position to which a belt of a belt conveyor has moved. The torque refers to torque of each joint of a robot arm. The detection device 4 inputs input data corresponding to a detection result to the controller 5.

The controller 5 is a control device such as a PLC or the like. Based on the input data input from the detection device 4, the controller 5 generates output data for controlling the object apparatus 3. The controller 5 outputs the generated output data as a control signal to the object apparatus 3. Accordingly, the controller 5 controls the object apparatus 3. The controller 5 generates time series data (hereinafter referred to as "actual machine trace data") relating to control of the object apparatus 3. The actual machine trace data includes time series variable data used in a control program. For example, in the case where the object apparatus 3 is a belt conveyor, the actual machine trace data indicates each position to which the belt of the belt conveyor has moved in a time series.

The failure prediction system 2 is a system providing a user with information for predicting a failure in the object apparatus 3. The failure prediction system 2 may predict a failure in the detection device 4. For example, the failure prediction system 2 may predict a decrease in sensitivity of a sensor based on information for predicting a failure in the sensor being the detection device 4. The failure prediction system 2 includes an input device 6, a failure prediction support device 7, and a display device 8.

The input device 6 is configured using an existing input device such as a keyboard, a pointing device (mouse, tablet, etc.), a button, a touch panel or the like. The input device 6 inputs data (hereinafter referred to as "operation input data") corresponding to an operation on the input device 6 to the failure prediction support device 7.

The failure prediction support device 7 is an information processing device providing the user with the information for predicting a failure in the object apparatus 3. The failure prediction support device 7 is, for example, a personal computer, a tablet terminal, or a smartphone terminal. The failure prediction support device 7 acquires the actual machine trace data from the controller 5.

As a simulator, the failure prediction support device 7 simulates the object apparatus 3 and the detection device 4 in a state in which no failure occurs. In addition, as an emulator, the failure prediction support device 7 imitates the control function of the controller 5. By imitating the control function of the controller 5, the failure prediction support device 7 generates time series data (hereinafter referred to as "simulation trace data") relating to control of the simulated object apparatus 3.

The failure prediction support device 7 acquires condition data from the input device 6. The failure prediction support device 7 detects a difference between the actual machine trace data and the simulation trace data. The failure prediction support device 7 determines whether or not the detected difference satisfies a condition based on the condition data. When it is determined that the difference satisfies the condition, the failure prediction support device 7 causes the display device 8 to display an image notifying that the difference satisfying the condition has been detected.

The display device 8 is an image display device such as a cathode ray tube (CRT) display, a liquid crystal display, an organic electroluminescence (EL) display or the like. The display device 8 displays the image generated by the failure prediction support device 7.

Figure 2:
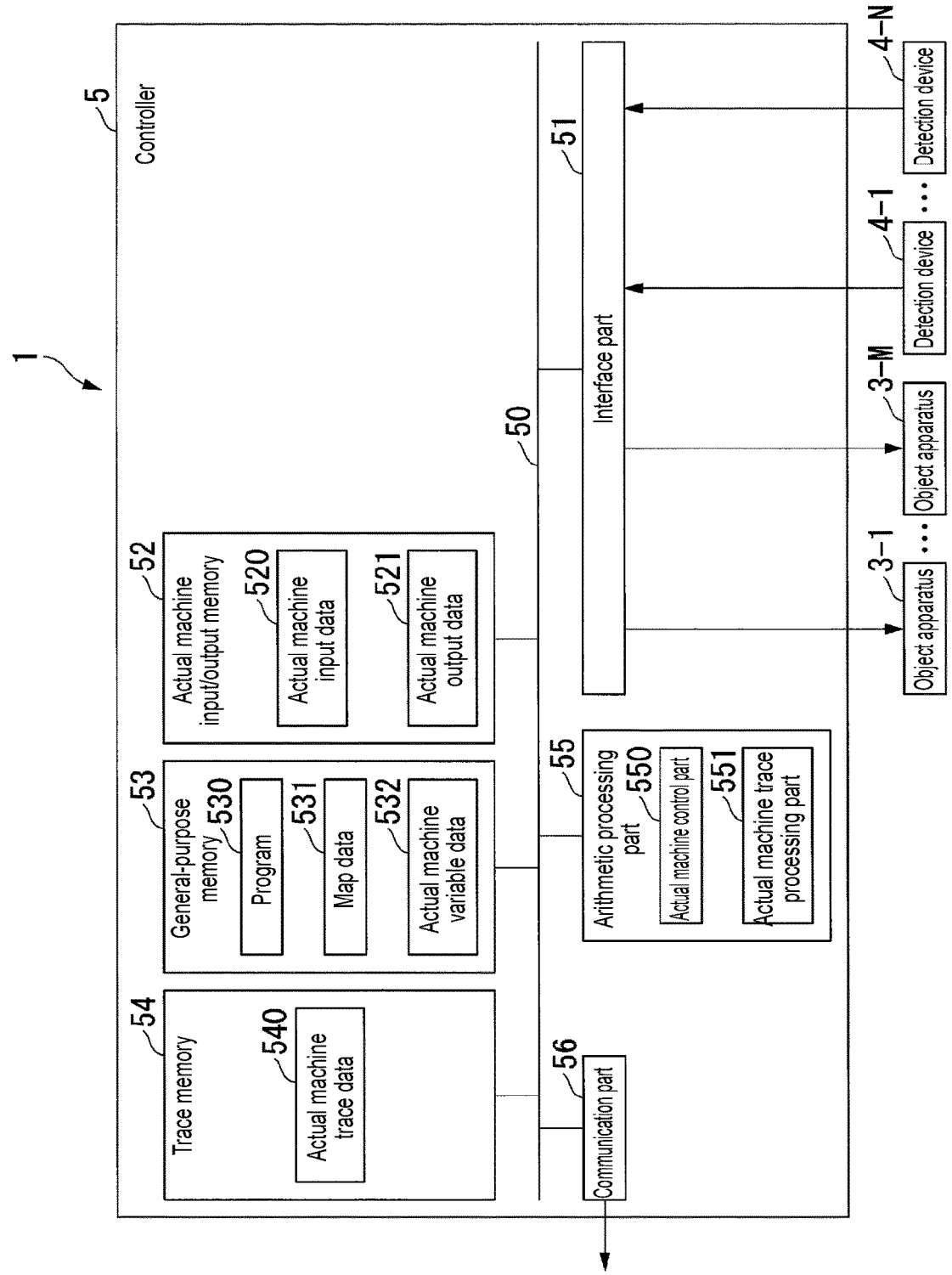
FIG. 2 illustrates an example of a configuration of a controller.

FIG. 2 illustrates an example of a configuration of the controller 5. The controller 5 includes a bus 50, an interface part 51, an actual machine input/output memory 52, a general-purpose memory 53, a trace memory 54, an arithmetic processing part 55 and a communication part 56.

The bus 50 is a bus transferring data in the controller 5. The interface part 51 acquires the input data from the detection device 4. The interface part 51 converts data communicated between the controller 5 and the detection device 4 into a predetermined form. The interface part 51 records the input data in a predetermined form in the actual machine input/output memory 52 for each detection device 4.

The interface part 51 acquires the output data from the actual machine input/output memory 52. The interface part 51 converts data communicated between the controller 5 and the object apparatus 3 into a predetermined form. The interface part 51 outputs to the object apparatus 3 the output data in a predetermined form defined by a standard such as EtherCAT (Ethernet for Control Automation Technology) (registered trademark) or the like.

The actual machine input/output memory 52 is a volatile recording medium such as a random access memory (RAM) or the like. The actual machine input/output memory 52 stores actual machine input data 520 and actual machine output data 521. The actual machine input data 520 is the input data acquired by the interface part 51 from the detection device 4. The actual machine input/output memory 52 stores the actual machine input data 520 for each detection device 4. The actual machine output data 521 is the data output from the interface part 51 to the object apparatus 3. The actual machine input/output memory 52 records the actual machine output data 521 for each object apparatus 3.

The general-purpose memory 53 is a volatile recording medium such as a RAM or the like. The general-purpose memory 53 stores a program 530, map data 531, and actual machine variable data 532. The program 530 is a program executed by the arithmetic processing part 55. The program 530 includes a program for controlling the object apparatus 3 and a program for generating the actual machine trace data.

The map data 531 is data indicating mapping between an input port and an output port of the interface part 51 and an address in the actual machine input/output memory 52. Therefore, the map data 531 indicates an association between the detection device 4 and the actual machine input data 520 and an association between the object apparatus 3 and the actual machine output data 521. The map data 531 is transferred from a nonvolatile memory device to the general-purpose memory 53.

The actual machine variable data 532 is variable data used by the arithmetic processing part 55 to control the object apparatus 3. The actual machine variable data 532 includes each variable data representing the actual machine input data 520 and the actual machine output data 521.

The trace memory 54 is a memory device such as a magnetic hard disk device or a semiconductor memory device. The trace memory 54 is a nonvolatile memory device (non-transitory recording medium). The trace memory 54 stores actual machine trace data 540.

The actual machine trace data 540 is time series data relating to control of the object apparatus 3. In the actual machine trace data 540, for each variable data included in the actual machine variable data 532, input/output type, variable name, variable type name, variable value, and timestamp (time information) are associated with each other. The input/output type is information indicating whether each variable data is the actual machine input data 520 or the actual machine output data 521. In the actual machine trace data 540, in place of timestamp, flag information (hereinafter referred to as "start synchronization flag information") indicating start timing of control of the object apparatus 3 may be associated with variable name and so on.

The arithmetic processing part 55 is configured using a processor such as a central processing unit (CPU) or the like. The arithmetic processing part 55 functions as an actual machine control part 550 and an actual machine trace processing part 551 by executing the program 530.

The actual machine control part 550 controls the object apparatus 3 by changing the actual machine variable data 532 during execution of the program 530. For example, the actual machine control part 550 substitutes a value of the actual machine input data 520 for a value of the variable data representing the actual machine input data 520 in the actual machine variable data 532. The actual machine control part 550 substitutes a value of the variable data representing the actual machine output data 521 for a value of the actual machine output data 521 in the actual machine variable data 532.

The actual machine trace processing part 551 generates the actual machine trace data 540 by executing the program 530. The actual machine trace processing part 551 records the actual machine trace data 540 in the trace memory 54.

The communication part 56 communicates with the failure prediction support device 7. The communication part 56 sends the actual machine trace data 540 to the failure prediction support device 7.

Figure 3:
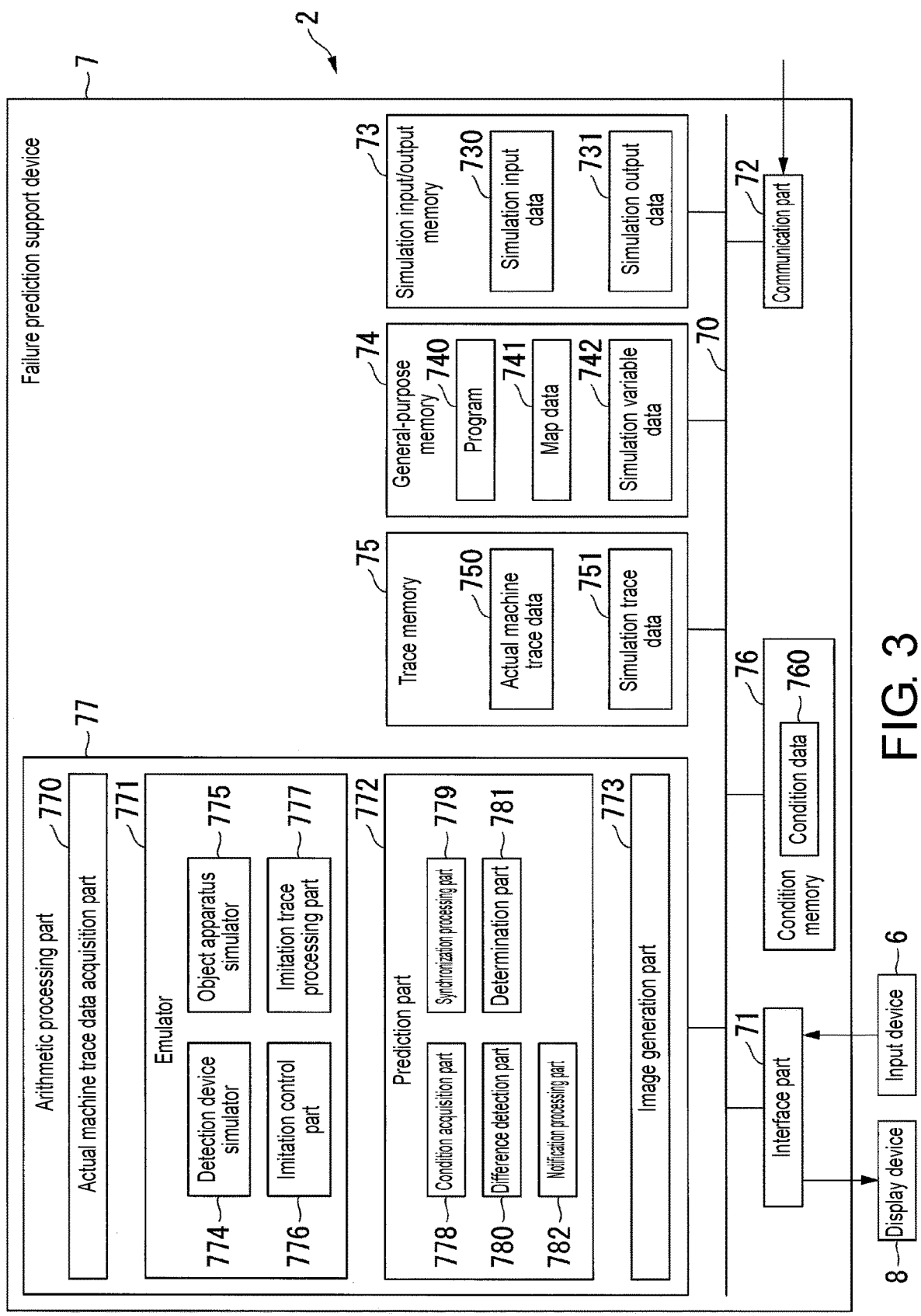
FIG. 3 illustrates an example of a configuration of a failure prediction support device.

FIG. 3 illustrates an example of a detailed configuration of the failure prediction support device 7. The failure prediction support device 7 includes a bus 70, an interface part 71, a communication part 72, a simulation input/output memory 73, a general-purpose memory 74, a trace memory 75, a condition memory 76, and an arithmetic processing part 77.

The bus 70 is a bus transferring data in the failure prediction support device 7.

The interface part 71 acquires the operation input data from the input device 6. The interface part 71 converts the operation input data into a predetermined form. The interface part 71 outputs the operation input data to the arithmetic processing part 77.

The interface part 71 acquires image data from the arithmetic processing part 77. The interface part 71 converts the image data into a predetermined image signal. The interface part 71 sends the image signal to the display device 8.

The communication part 72 communicates with the controller 5. The communication part 72 acquires the actual machine trace data 540 from the controller 5. The communication part 72 may send data generated by the arithmetic processing part 77 to the controller 5.

The simulation input/output memory 73 is a volatile recording medium such as a RAM or the like. The simulation input/output memory 73 stores simulation input data 730 and simulation output data 731. The simulation input data 730 is variable data generated by the arithmetic processing part 77 simulating generation processing of the actual machine input data 520 in the actual machine control part 550. The simulation output data 731 is variable data generated by the arithmetic processing part 77 simulating generation processing of the actual machine output data 521 in the actual machine control part 550.

The general-purpose memory 74 is a volatile recording medium such as a RAM or the like. The general-purpose memory 74 stores a program 740, map data 741, and simulation variable data 742. The program 740 is a program executed by the arithmetic processing part 77. The program 740 includes a program simulating the detection device 4 and the object apparatus 3 and a program providing the user with the information for predicting a failure in the object apparatus 3.

The map data 741 is data indicating mapping between an input port and an output port of the interface part 71 and an address in the simulation input/output memory 73. Therefore, the map data 741 indicates an association between the detection device 4 whose operation is simulated and the simulation input data 730 and an association between the object apparatus 3 whose operation is simulated and the simulation output data 731. The map data 741 is transferred from a nonvolatile memory device to the general-purpose memory 74.

The simulation variable data 742 is variable data generated by simulating generation processing of the actual machine variable data 532 by the arithmetic processing part 77 that simulates the control function of the controller 5. The simulation variable data 742 includes variable data representing the simulation input data 730. Also, the simulation variable data 742 includes variable data representing the simulation output data 731.

The trace memory 75 is a memory device such as a magnetic hard disk device or a semiconductor memory device. The trace memory 75 is a nonvolatile memory device (non-transitory recording medium). The trace memory 75 stores actual machine trace data 750 and simulation trace data 751. The actual machine trace data 750 and the simulation trace data 751 may be backed up as log information in a nonvolatile memory different from the trace memory 75.

The actual machine trace data 750 is duplicate data of the actual machine trace data 540 acquired from the controller 5.

The simulation trace data 751 is time series data relating to control of the simulated object apparatus 3. In the simulation trace data 751, for each variable data included in the simulation variable data 742, input/output type, variable name, variable type name, variable value, and timestamp (time information) are associated with each other. The input/output type is information indicating whether the variable data is the simulation input data 730 or the simulation output data 731.

The condition memory 76 is a volatile recording medium such as a RAM or the like. The condition memory 76 stores condition data 760. The condition data 760 is data indicating a condition relating to an abnormality in the actual machine trace data 750, and is predetermined by the user. For example, in the case where the failure prediction support device 7 notifies the user that a difference between the actual machine trace data 750 and the simulation trace data 751 has been detected, the user predetermines a condition that the difference satisfies. The condition data 760 is input as the operation input data to the failure prediction support device 7 from the input device 6.

The arithmetic processing part 77 is configured using a processor such as a CPU or the like. The arithmetic processing part 77 functions as an actual machine trace data acquisition part 770, an emulator 771, a prediction part 772, and an image generation part 773 by executing the program 740.

Details of the actual machine trace data acquisition part 770 are explained.

The actual machine trace data acquisition part 770 acquires the actual machine trace data 540 from the communication part 72. The actual machine trace data acquisition part 770 duplicates the actual machine trace data 540 and records in the trace memory 75 the actual machine trace data 750 being duplicate data.

Details of the emulator 771 are explained.

The emulator 771 is a device imitating the control function of the controller 5. The emulator 771 functions as a detection device simulator 774, an object apparatus simulator 775, an imitation control part 776, and an imitation trace processing part 777.

The detection device simulator 774 simulates the detection device 4. The detection device simulator 774 generates the simulation input data 730 by simulating the generation processing of the actual machine input data 520 in the detection device 4. An initial value of the simulation input data 730 is the same as an initial value of the actual machine input data 520. The detection device simulator 774 updates the simulation input data 730 by executing control processing in accordance with the simulation output data 731.

The object apparatus simulator 775 uses variable data pre-adjusted to represent the object apparatus 3 in a normal state to simulate the object apparatus 3 in the normal state. The object apparatus simulator 775 generates the simulation output data 731 by simulating the generation processing of the actual machine output data 521 in the object apparatus 3. If no failure occurs in the actual object apparatus 3, the difference between the actual machine trace data 750 and the simulation trace data 751 is equal to or less than a threshold value.

The imitation control part 776 imitates the control function of the actual machine control part 550. The imitation control part 776 generates the simulation variable data 742 by imitating the generation processing of the actual machine variable data 532 in the actual machine control part 550. While the actual machine control part 550 is executing the generation processing of the actual machine variable data 532, the imitation control part 776 executes generation processing of the simulation variable data 742. That is, almost at the same time when the actual machine control part 550 executes control of the object apparatus 3, the imitation control part 776 executes control of the simulated object apparatus 3.

The imitation trace processing part 777 generates the simulation trace data 751. The imitation trace processing part 777 records the simulation trace data 751 in the trace memory 75.

Details of the prediction part 772 are explained.

The prediction part 772 generates information for predicting a failure for one or more object apparatuses 3 selected from the object apparatuses 3-1 to 3-M. The prediction part 772 functions as a condition acquisition part 778, a synchronization processing part 779, a difference detection part 780, a determination part 781, and a notification processing part 782.

The condition acquisition part 778 acquires the condition data 760 from the input device 6. The condition acquisition part 778 records the acquired condition data 760 in the condition memory 76.

The synchronization processing part 779 acquires the actual machine trace data 750 and the simulation trace data 751 from the trace memory 75. The synchronization processing part 779 synchronizes the actual machine trace data 750 and the simulation trace data 751 with each other.

For example, the synchronization processing part 779 searches the actual machine trace data 750 for a timestamp indicating time t1, and initializes a read pointer of the actual machine trace data 750 so as to point out an address of the timestamp searched. The synchronization processing part 779 searches the simulation trace data 751 for the timestamp indicating time t1, and initializes a read pointer of the simulation trace data 751 so as to point out an address of the timestamp searched. Accordingly, the synchronization processing part 779 synchronizes the actual machine trace data 750 and the simulation trace data 751, which are associated with the timestamps indicating the same time information, with each other. For example, the synchronization processing part 779 may synchronize the actual machine trace data 750 and the simulation trace data 751 associated with the start synchronization flag information with each other. For example, the synchronization processing part 779 may acquire pattern information (waveform pattern information) of time change in advance from the input device 6, and synchronize the actual machine trace data 750 and the simulation trace data 751 having the same time change pattern with each other.

If the emulator 771 goes down, the detection device simulator 774 reacquires the actual machine input data 520 from the actual machine trace data 750 after restart of the emulator 771. In addition, the object apparatus simulator 775 reacquires the actual machine output data 521 from the actual machine trace data 750. Accordingly, the synchronization processing part 779 is capable of synchronizing the actual machine trace data 750 and the simulation trace data 751 with each other without re-executing synchronization processing.

In addition, if the actual machine control part 550 goes down, the synchronization processing part 779 re-executes the synchronization processing after restart of the actual machine control part 550. If synchronization cannot be achieved for a long time such as one hour or longer even if the synchronization processing part 779 repeatedly re-executes the synchronization processing, the synchronization processing part 779 may notify the user of variable data among the variable data of the actual machine trace data 750 that cannot be synchronized with the simulation trace data 751.

The difference detection part 780 acquires the actual machine trace data 750 and the simulation trace data 751 on which the synchronization processing has been executed. While the actual machine control part 550 is executing control of the object apparatus 3, the difference detection part 780 detects the difference between the actual machine trace data 750 and the simulation trace data 751 on which the synchronization processing has been executed in a predetermined cycle.

The determination part 781 acquires the condition data 760 from the condition memory 76. The determination part 781 determines whether or not the difference between the actual machine trace data 750 and the simulation trace data 751 satisfies a condition indicated by the condition data 760.

When it is determined by the determination part 781 that the difference satisfies the condition, the notification processing part 782 notifies that the difference satisfying the condition has been detected. For example, the notification processing part 782 causes the display device 8 to display an alarm image indicating that the difference has been detected. The alarm image includes, for example, message information acquired from the input device 6.

Details of the image generation part 773 are explained.

The image generation part 773 generates an image. While the actual machine control part 550 is executing the generation processing of the actual machine variable data 532, the image generation part 773 generates a graph of a waveform indicating a time change in the actual machine trace data 750 and a graph of a waveform indicating a time change in the simulation trace data 751. The image generation part 773 displays the waveform graphs whose time axes are combined in a side-by-side manner on a screen of the display device 8. The image generation part 773 may display the waveform graphs whose time axes are combined in an overlapping manner on the screen of the display device 8. By comparing the waveform graphs whose time axes are combined on the screen, the user can easily determine whether or not a value of the actual machine trace data 750 is abnormal.

The image generation part 773 generates an image indicating a source code of the program 740. The image generation part 773 generates a moving image indicating appearance of the object apparatus 3 in operation based on the actual machine trace data 750. The image generation part 773 generates a moving image indicating the appearance of the object apparatus 3 in operation based on the simulation trace data 751. The image generation part 773 generates an alarm image including a variable name and a message. The image generation part 773 causes the display device 8 to display the generated image.

Next, details of information processing of the prediction part 772 are explained.

FIG. 4 illustrates an example of the condition data 760. In the condition data 760, variable, permissible error, number of determination points, establishment count, establishment count detection period, and message are associated with each other. The variable is each variable data representing the simulation input data 730 and the actual machine input data 520. These variables are variables for determining establishment of a condition with respect to a difference detected by the difference detection part 780. The permissible error is a value obtained by dividing an absolute value (|Y1−X1|) of a difference between a value Y1 of the simulation trace data 751 and a value X1 of the actual machine trace data 750 by the value X1 of the actual machine trace data 750. Therefore, if the permissible error is, for example, 10%, (|Y1−X1|=X1×0.10) is established. The number of determination points is number of times whether or not the detected difference exceeds the permissible error is determined within a predetermined period. The establishment count is number of times a condition that the detected difference exceeds the permissible error is established. The number of times the condition is established may be number of times of establishment regardless of whether or not the establishment is continuous in time series. The establishment count detection period is a period for detecting the establishment count. The establishment count detection period is set as a period in units of cycle, a period in units of millisecond, a period from trigger rise to the next rise, or the like. In the case where the condition is established for the number of times set by the establishment count within the establishment count detection period, the notification processing part 782 notifies that the difference has been detected. The message is a character string including characters arbitrarily designated by the user. The character string arbitrarily designated by the user is displayed on the display device 8 together with a default message.

Figure 5:
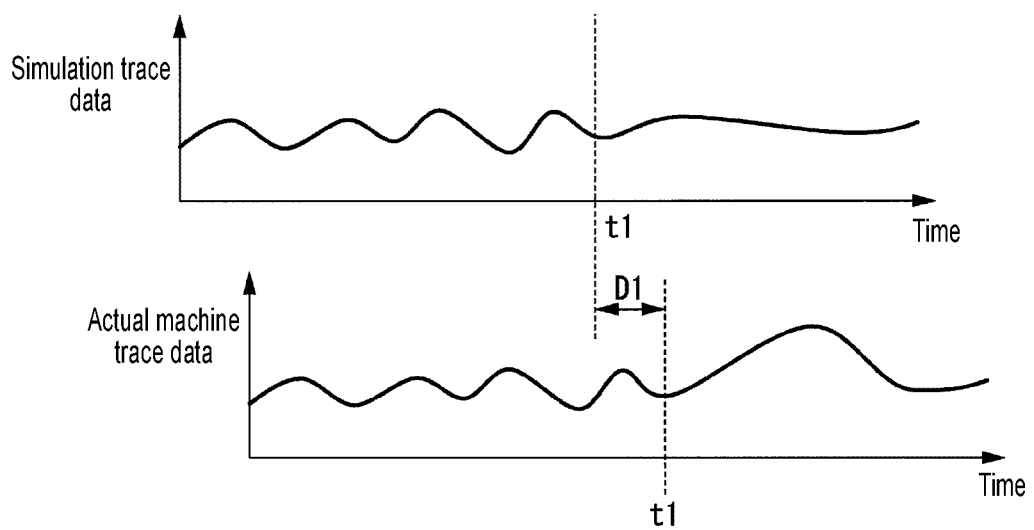
FIG. 5 illustrates an example of actual machine trace data and simulation trace data before synchronization processing is executed.

FIG. 5 illustrates an example of the actual machine trace data 750 and the simulation trace data 751 before synchronization processing is executed. The vertical axis of "simulation trace data" in FIG. 5 indicates the value of the simulation input data 730 indicated by the variable data included in the simulation variable data 742 of the simulation trace data 751. The horizontal axis of "simulation trace data" indicates the timestamp associated with the simulation input data 730. The vertical axis of "actual machine trace data" in FIG. 5 indicates the value of the actual machine input data 520 indicated by the variable data included in the actual machine variable data 532 of the actual machine trace data 750. The horizontal axis of "actual machine trace data" indicates the timestamp associated with the actual machine input data 520. In FIG. 5, time t1 of the actual machine trace data 750 is later than time t1 of the simulation trace data 751 by a time D1. The synchronization processing part 779 synchronizes the time information of the actual machine trace data 750 and the simulation trace data 751. In FIG. 5, by shifting the address pointed out by the read pointer from which the simulation trace data 751 is read by an address corresponding to the time D1, time t1 of the actual machine trace data 750 and time t1 of the simulation trace data 751 are synchronized with each other.

Based on the fact that the time change pattern in the actual machine trace data 750 before time t1 is the same as the time change pattern in the simulation trace data 751 before time t1, the actual machine trace data 750 and the simulation trace data 751 may be synchronized with each other.

Figure 6:
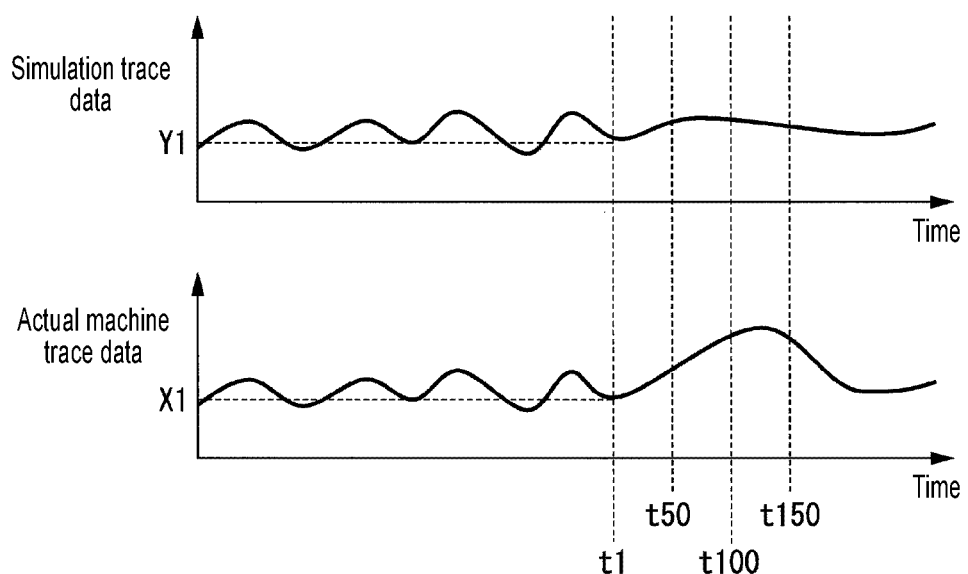
FIG. 6 illustrates an example of actual machine trace data and simulation trace data after synchronization processing is executed.

FIG. 6 illustrates an example of the actual machine trace data 750 and the simulation trace data 751 after synchronization processing is executed. The determination part 781 determines whether or not a difference detected within the establishment count detection period (e.g., 1000 ms) exceeds the permissible error for a plurality of determination points. In FIG. 6, the determination points are set at each time from t1 to t50, from t51 to t100, and from t101 to t150. As an example, the condition data 760 indicates 10% as the permissible error, 50 points as the number of determination points, and 3 times as the establishment count.

The determination part 781 determines whether or not the number of determination points at which the difference exceeds the permissible error of 10% is equal to or more than the number of determination points being 50. In the case where it is determined that the number of determination points is 50 or more, the determination part 781 determines whether or not the number of times the number of determination points has been determined to be 50 or more is equal to or more than the establishment count of 3 times. In the case where the number of times the number of determination points has been determined to be 50 or more is equal to or more than the establishment count of 3 times, the determination part 781 determines that the difference between the actual machine trace data 750 and the simulation trace data 751 satisfies the condition.

In FIG. 6, the determination part 781 determines whether or not the detected difference |Y1−X1| is equal to or more than the permissible error of 10% for each variable with respect to the difference at the plurality of determination points within the establishment count detection period. The determination part 781 determines whether or not the detected difference |Y1−X1| is equal to or more than the permissible error of 10% for each variable with respect to the difference at fifty determination points from time t1 to time t50. If the difference |Y1−X1| exceeds the permissible error of 10% in this determination (the establishment count is once), the determination part 781 similarly determines for each variable with respect to the difference at fifty determination points from time t51 to time t100. If the difference |Y1−X1| exceeds the permissible error of 10% in this determination (the establishment count is twice), the determination part 781 similarly determines for each variable with respect to the difference at fifty determination points from time t101 to time t150. If the difference |Y1−X1| exceeds the permissible error of 10% in this determination (the establishment count is 3 times), the determination part 781 outputs to the notification processing part 782 a signal indicating that the difference satisfies the condition within the establishment count detection period.

Next, an example of operation of the failure prediction system 2 is explained.

Figure 7:
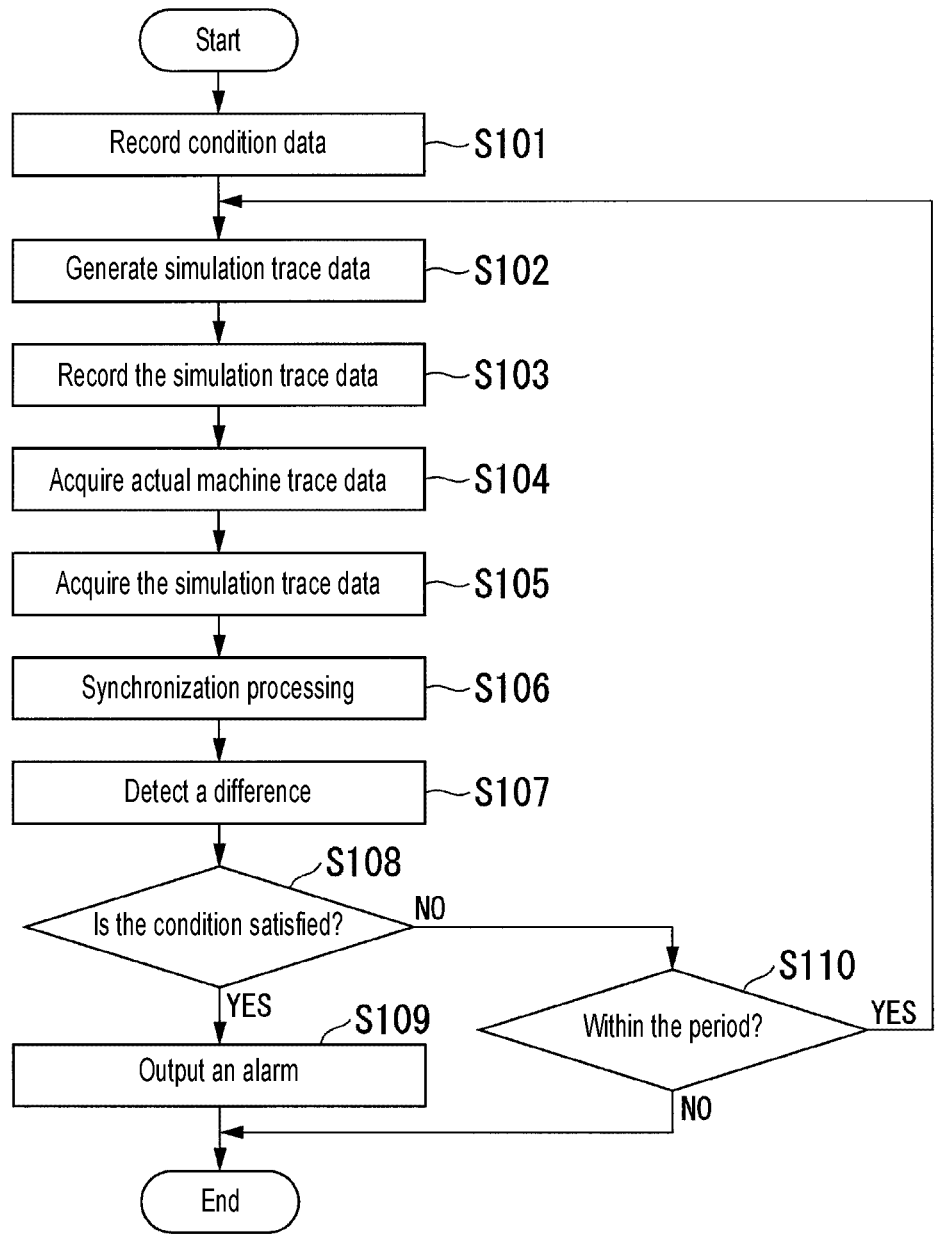
FIG. 7 is a flowchart showing an example of operation of the failure prediction system.

FIG. 7 is a flowchart showing an example of operation of the failure prediction system 2. The condition acquisition part 778 acquires the condition data 760 from the input device 6 and records the condition data 760 in the condition memory 76 (step S101). The imitation trace processing part 777 generates the simulation trace data 751 based on the simulation variable data 742 generated by the imitation control part 776 (step S102). The imitation trace processing part 777 records the generated simulation trace data 751 in the trace memory 75 (step S103).

The synchronization processing part 779 acquires the actual machine trace data 750 (step S104). The synchronization processing part 779 acquires the simulation trace data 751 (step S105). The synchronization processing part 779 synchronizes the time information of the actual machine trace data 750 and the simulation trace data 751 (step S106). The difference detection part 780 detects a difference between the simulation trace data 751 and the actual machine trace data 750 (step S107).

The determination part 781 determines whether or not the difference satisfies a condition (step S108). In the case where the difference satisfies the condition (step S108: YES), the notification processing part 782 executes alarm processing (step S109). The prediction part 772 terminates execution of prediction processing.

In the case where the difference does not satisfy the condition (step S108: NO), the determination part 781 determines whether or not time of a timestamp included in the actual machine trace data 750 is within the establishment count detection period (step S110). In the case where the time of the timestamp included in the actual machine trace data 750 is within the establishment count detection period (step S110: YES), the imitation trace processing part 777 executes the processing of step S102. In the case where the time of the timestamp included in the actual machine trace data 750 is not within the establishment count detection period (step S110: NO), the prediction part 772 terminates the execution of the prediction processing.

Next, an image displayed on the display device 8 is explained.

Figure 8:
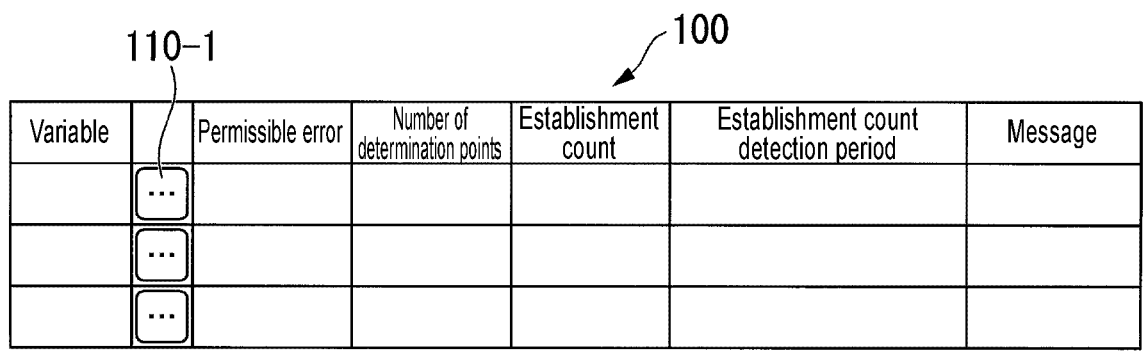
FIG. 8 illustrates a display example of a condition setting image.

FIG. 8 illustrates a display example of a condition setting image 100. The image generation part 773 causes the display device 8 to display the condition setting image 100 being an image used for setting the condition data 760. The user can click a display button image 110-1 by operating the input device 6. In the case where the display button image 110-1 is clicked, the image generation part 773 causes the display device 8 to display a variable setting image being a dialog box used for setting a variable and the like.

Figure 9:
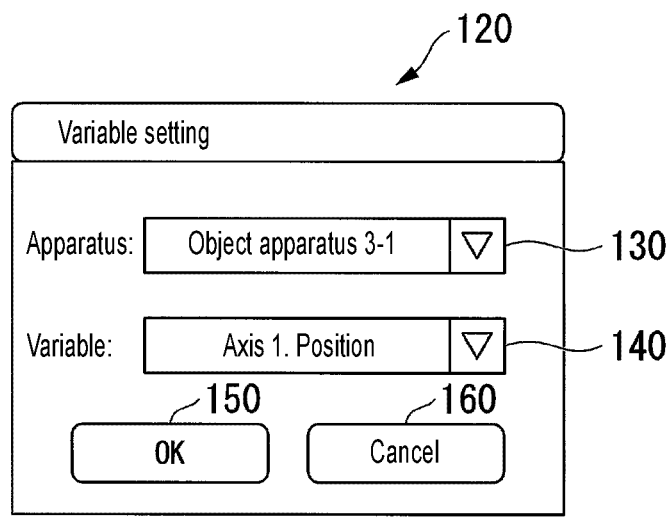
FIG. 9 illustrates a display example of a variable setting image.

FIG. 9 illustrates a display example of a variable setting image 120. The image generation part 773 acquires configuration information of the control system 1 from, for example, an external device. The image generation part 773 lists, in an apparatus list box image 130, name or identification information of each object apparatus 3 included in the configuration information of the control system 1. The name of each object apparatus 3 listed in the apparatus list box image 130 can be selected by the user operating the input device 6.

The image generation part 773 acquires information of a variable group from, for example, an external device. The image generation part 773 lists, in a variable list box image 140, name of the variable data included in the information of the variable group. For example, the image generation part 773 lists variables "axis 1. position" and "axis 2. torque" in the variable list box image 140. The name of the variable data listed in the variable list box image 140 can be selected by the user operating the input device 6.

In the case where an OK operation image 150 is clicked, the image generation part 773 enters the name of the selected variable data in the condition setting image 100. In the case where a cancel operation image 160 is clicked, the image generation part 773 erases the variable setting image 120 from the screen of the display device 8 without entering the name of the selected variable data in the condition setting image 100.

FIG. 10 illustrates a display example of the condition setting image 100 in which the condition data 760 is registered for the variable "axis 1. position." By operating the input device 6, the user enters each item of the condition data 760 in the condition setting image 100. The condition acquisition part 778 adds each item entered in the condition setting image 100 to the condition data 760. In FIG. 10, the condition acquisition part 778 adds the variable "axis 1. position," the permissible error "10%," the number of determination points "20 points," the establishment count "2 times" and the message "please check the motor" to the condition data 760.

The user can click a display button image 110-2 by operating the input device 6. In the case where the display button image 110-2 is clicked, the image generation part 773 causes the display device 8 to display the variable setting image 120.

Figure 11:
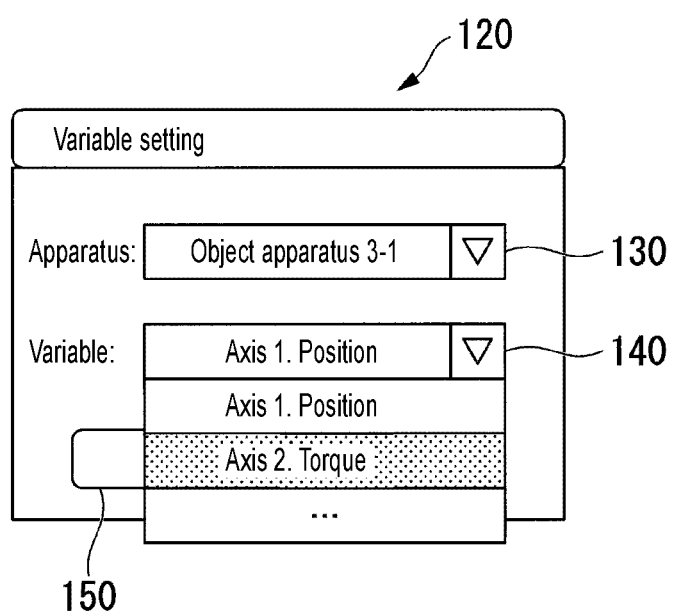
FIG. 11 illustrates a display example of a variable setting image showing a pull-down menu of variables.

FIG. 11 illustrates a display example of the variable setting image 120 showing a pull-down menu of variables. The user can click the variable list box image 140 by operating the input device 6. In the case where the variable list box image 140 is clicked, the image generation part 773 causes the display device 8 to display a pull-down menu of variables. The variables listed in the pull-down menu of variables can be selected by the user operating the input device 6. In the case where the OK operation image 150 is clicked, the image generation part 773 enters the name of the selected variable data in the condition setting image 100.

FIG. 12 illustrates a display example of the condition setting image 100 in which the condition data 760 are registered for a plurality of variables, namely, "axis 1. position" and "axis 2. torque." By the operation explained using FIG. 11, the condition acquisition part 778 adds the variable "axis 2. torque" to the condition data 760. Also, by the user operating the input device 6, the condition acquisition part 778 adds the permissible error "10%," the number of determination points "50 points," the establishment count "3 times" and the message "please check the speed reducer" to the condition data 760.

Figure 13:
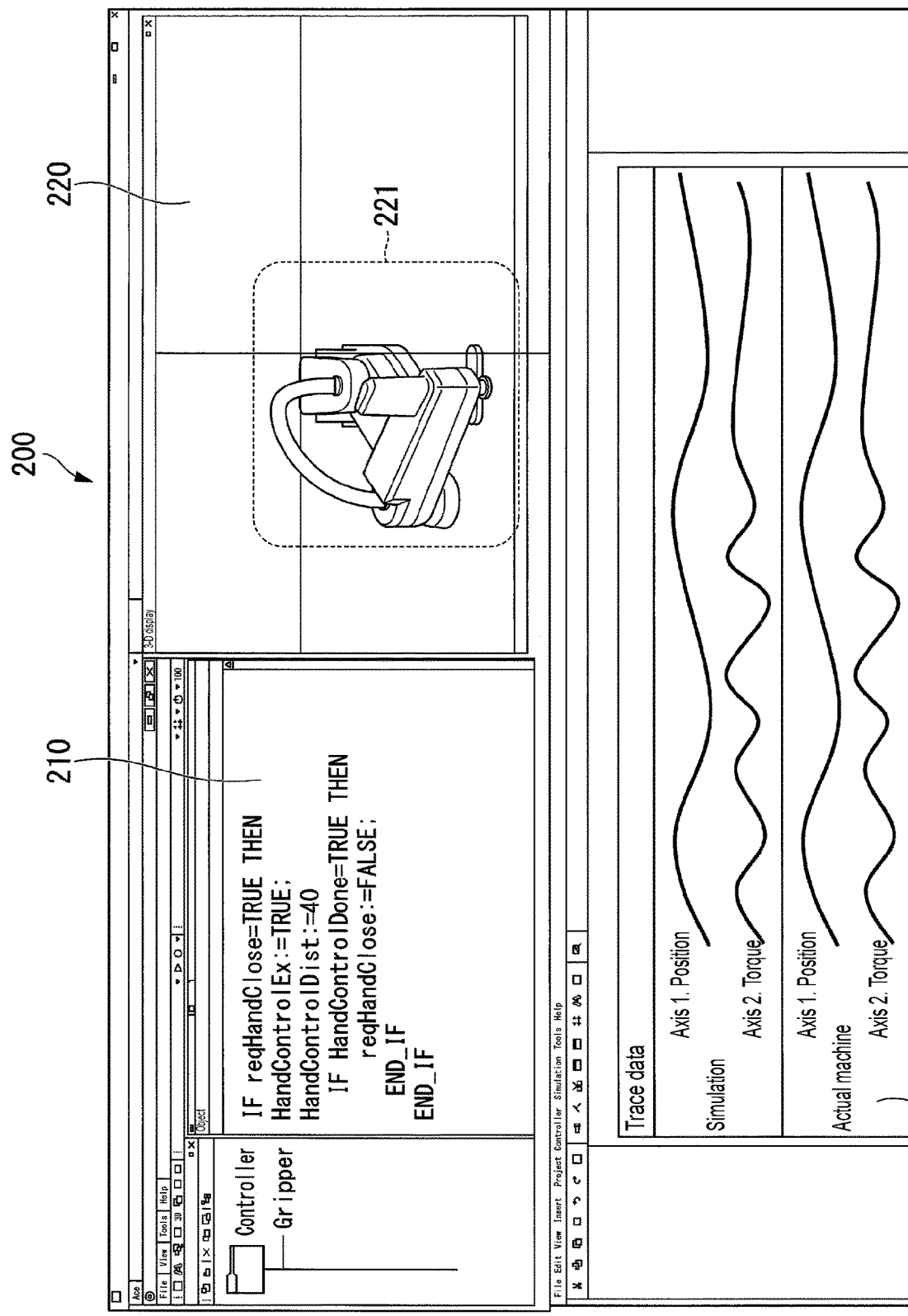
FIG. 13 illustrates a display example of a monitoring image.

FIG. 13 illustrates a display example of a monitoring image 200. The image generation part 773 displays the monitoring image 200 on the display device 8. The monitoring image 200 includes a source code display area 210, an object apparatus display area 220, and a trace data display area 230.

The source code display area 210 is an area displaying a source code of the program 530. The object apparatus display area 220 is an area displaying an object apparatus superimposed image 221. The object apparatus superimposed image 221 is a computer graphic image obtained by superimposing a moving image indicating the appearance of the object apparatus 3 (hereinafter referred to as "virtual object apparatus") whose operation is simulated by the object apparatus simulator 775 on a moving image indicating the appearance of the object apparatus 3 (hereinafter referred to as "actual object apparatus") controlled by the controller 5.

The moving image of the actual object apparatus is generated based on the actual machine trace data 750, thereby reproducing operation of the actual object apparatus in the object apparatus display area 220. The moving image of the virtual object apparatus is generated based on the simulation trace data 751, thereby reproducing operation of the virtual object apparatus in the object apparatus display area 220. Therefore, as the difference between the actual machine trace data 750 and the simulation trace data 751 increases, in the object apparatus superimposed image 221, the moving image of the actual object apparatus and the moving picture of the virtual object apparatus deviate from each other.

The trace data display area 230 is an area displaying a time series graph of the synchronized actual machine trace data 750 and a time series graph of the synchronized simulation trace data 751. Since the time series graphs are displayed side by side, the user can easily compare the time series graphs with each other. The trace data display area 230 may display a difference instruction image 231 being an image indicating a position of a detected difference. The difference instruction image 231 is superimposed on a time series graph so as to cover an area in the time series graph where the difference is detected.

Figure 14:
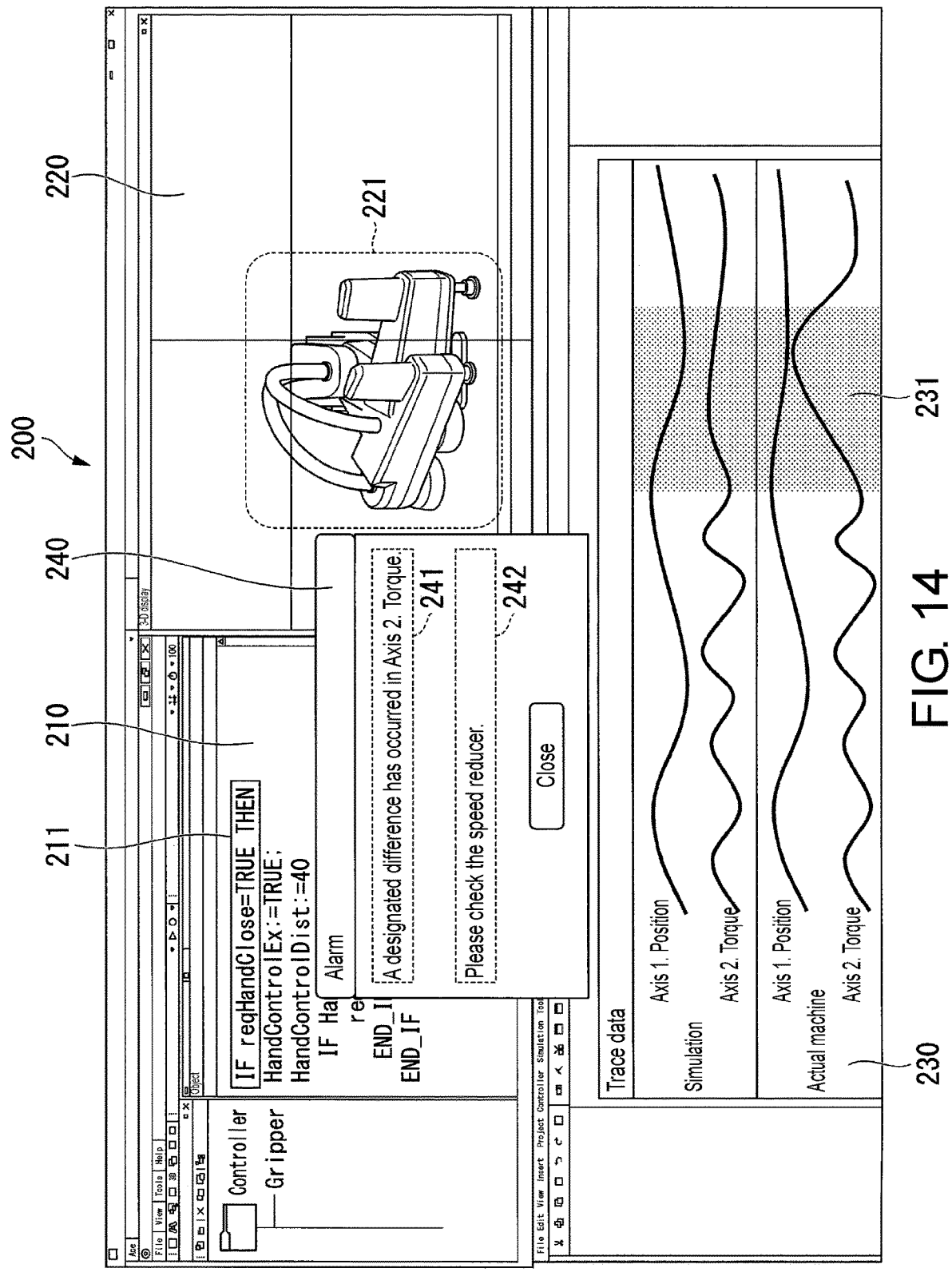
FIG. 14 illustrates a display example of a monitoring image on which an alarm image is superimposed.

FIG. 14 illustrates a display example of the monitoring image 200 on which an alarm image 240 is superimposed. The alarm image 240 includes a first message image 241 and a second message image 242. The first message image 241 is an image of a default message associated in advance with a variable of the detected difference. The second message image 242 is an image of a message entered in the condition data 760 by the user. The user who confirms the message can easily specify a portion to be checked in the object apparatus 3 even if they are not experts.

The image generation part 773 may display an event log. For example, by displaying a highlight image 211 of a source code of a position where execution is stopped, the image generation part 773 may emphasize and display a part of the source code as the event log. If an information terminal is connected to the controller 5, the image generation part 773 may display the alarm image 240 on a screen of the information terminal.

As described above, the failure prediction support device 7 includes the difference detection part 780, the determination part 781 and the notification processing part 782. The difference detection part 780 acquires the actual machine trace data 750 (actual machine time series data) and the simulation trace data 751 (simulation time series data) from the trace memory 75. The difference detection part 780 detects the difference between the actual machine trace data 750 and the simulation trace data 751. The determination part 781 determines whether or not the difference satisfies the condition indicated by the condition data 760. In the case where it is determined that the difference satisfies the condition, the notification processing part 782 notifies that the difference has been detected.

Accordingly, by the failure prediction support device 7, the user can easily know an abnormality in the time series data included in the actual machine trace data 540.

The user can know in advance the possibility of a failure in the object apparatus 3 caused by deterioration over time. Since the failure prediction support device 7 visualizes a difference in data, the user can easily grasp a portion having problems.

The failure prediction support device 7 is capable of determining in real time the possibility of occurrence of a failure during operation of the object apparatus 3 and notifying the user of a determination result. The failure prediction support device 7 is capable of easily acquiring data necessary for failure prediction. In the failure prediction support device 7, since the object apparatus simulator 775 simulates the object apparatus 3 using the variable data pre-adjusted to represent operation of the object apparatus 3 in the normal state, even if there is no data of the initial state of the object apparatus 3, the determination result can be notified to the user. The failure prediction support device 7 is capable of recording a detected difference and the like as a log. Other systems are capable of further analyzing data recorded as logs by the failure prediction support device 7.

Although the embodiment of the disclosure has been explained in detail with reference to the drawings, the specific configuration is not limited to the present embodiment, and designs and the like within the scope not deviating from the gist of the disclosure are also included.

After the actual machine control part 550 has terminated control of the object apparatus 3, the difference detection part 780 may detect a difference between the actual machine trace data 750 and the simulation trace data 751 generated in the past. Accordingly, the user can analyze the possibility of a failure in the object apparatus 3 in detail.

The detection device simulator 774 may record the simulation input data 730 in the simulation input/output memory 73 in advance. The object apparatus simulator 775 may record the simulation output data 731 in the simulation input/output memory 73 in advance. The imitation control part 776 may execute control of the simulated object apparatus 3 by repeatedly using a prerecorded simulation result. That is, the imitation control part 776 may execute control of the simulated object apparatus 3 after the actual machine control part 550 has terminated control of the object apparatus 3.

The determination part 781 may not only determine whether the difference between the actual machine trace data 750 and the simulation trace data 751 satisfies the condition, but may also predict a time when the difference becomes a certain value or greater as a time when a failure occurs in the object apparatus 3, based on a time change in the difference. The notification processing part 782 may not only notify the user of the information for predicting a failure in the object apparatus 3 but may also notify the user of a prediction result of the time when a failure occurs in the object apparatus 3, or the like.

(Modifications)

Figure 15:
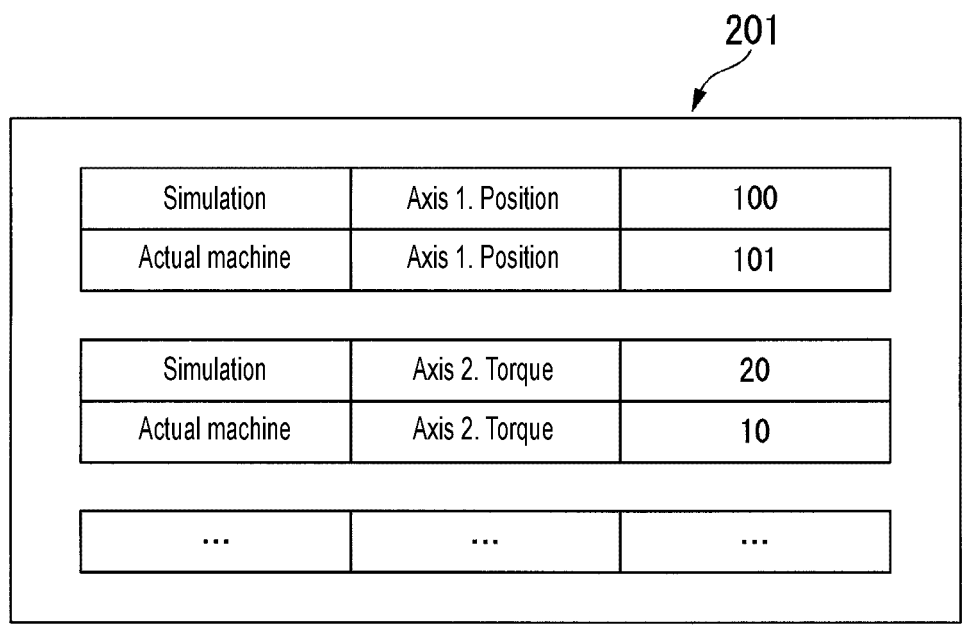
FIG. 15 illustrates a display example of variable values of variables representing simulation input data and variable values of variables representing actual machine input data.

FIG. 15 illustrates a display example of variable values of variables representing the simulation input data 730 and variable values of variables representing the actual machine input data 520. The image generation part 773 causes the display device 8 to display a monitoring image 201. In FIG. 15, "simulation" indicates a variable representing the simulation input data 730 in the simulation trace data 751. "Actual machine" indicates a variable representing the actual machine input data 520 in the actual machine trace data 540.

The image generation part 773 causes the display device 8 to display the variable values relating to the actual machine trace data 750 and the variable values relating to the simulation trace data 751 in a comparable manner. In FIG. 15, the monitoring image 201 includes an image in which the variable values of variables representing the simulation input data 730 and the variable values of variables representing the actual machine input data 520 are arranged side by side. The monitoring image 201 includes an image in which the variable value "100" of the variable "axis 1. position" representing the simulation input data 730 and the variable value "101" of the variable "axis 1. position" representing the actual machine input data 520 are arranged side by side. The monitoring image 201 includes an image in which the variable value "20" of the variable "axis 2. torque" representing the simulation input data 730 and the variable value "10" of the variable "axis 2. torque" representing the actual machine input data 520 are arranged side by side. The variable values are arranged side by side on the same screen in the form of, for example, a table. The variable values are updated as time elapses.

The user can easily compare the variable values of variables representing the simulation input data 730 with the variable values of variables representing the actual machine input data 520. In FIG. 15, it is easy for the user to know that the variable value "10" of the variable "axis 2. torque" representing the actual machine input data 520 is only half the variable value "20" of the variable "axis 2. torque" representing the simulation input data 730. Accordingly, the user can easily know an abnormality in the time series data relating to control of the apparatus.

What is claimed is:

1. A failure prediction support device comprising:
   a difference detection part, acquiring actual machine time series data being time series data relating to control of an apparatus and simulation time series data being time series data relating to control of the simulated apparatus, and detecting a difference between the actual machine time series data and the simulation time series data;
   a determination part, determining whether or not the difference satisfies a condition predetermined in relation to an abnormality in the actual machine time series data;
   a notification processing part, notifying that the difference has been detected when it is determined that the difference satisfies the condition; and
   a synchronization processing part, synchronizing the actual machine time series data and the simulation time series data with each other, wherein
   the difference detection part detects the difference between the synchronized actual machine time series data and simulation time series data.

2. The failure prediction support device according to claim 1, wherein the difference detection part records the actual machine time series data and the simulation time series data in a memory device.

3. The failure prediction support device according to claim 2, further comprising a condition acquisition part acquiring data indicating the condition.

4. The failure prediction support device according to claim 1, further comprising a condition acquisition part acquiring data indicating the condition.

5. The failure prediction support device according to claim 4, wherein the condition acquisition part further acquires a message being a character string comprising characters arbitrarily designated by a user, and the notification processing part further notifies with a message for each of the difference.

6. A failure prediction support method, executed by an information processing device and comprising:

acquiring actual machine time series data being time series data relating to control of an apparatus and simulation time series data being time series data relating to control of the simulated apparatus, and detecting a difference between the actual machine time series data and the simulation time series data;

determining whether or not the difference satisfies a condition predetermined in relation to an abnormality in the actual machine time series data;

notifying that the difference has been detected when it is determined that the difference satisfies the condition;

synchronizing the actual machine time series data and the simulation time series data with each other; and detecting the difference between the synchronized actual machine time series data and simulation time series data.

7. A non-transitory computer-readable recording medium storing a failure prediction support program for causing a computer to execute:

a procedure for acquiring actual machine time series data being time series data relating to control of an apparatus and simulation time series data being time series data relating to control of the simulated apparatus, and detecting a difference between the actual machine time series data and the simulation time series data;

a procedure for determining whether or not the difference satisfies a condition predetermined in relation to an abnormality in the actual machine time series data;

a procedure for notifying that the difference has been detected when it is determined that the difference satisfies the condition;

a procedure for synchronizing the actual machine time series data and the simulation time series data with each other; and a procedure for detecting the difference between the synchronized actual machine time series data and simulation time series data.

8. A failure prediction support device comprising:

an acquisition part, acquiring actual machine time series data being time series data relating to control of an apparatus and simulation time series data being time series data relating to control of the simulated apparatus;

a synchronization processing part, synchronizing the actual machine time series data and the simulation time series data with each other;

a difference detection part, detecting the difference between the synchronized actual machine time series data and simulation time series data; and an image generation part causing a display device to display a variable value relating to the actual machine time series data and a variable value relating to the simulation time series data in a comparable manner, wherein the comparable manner includes that the image generation part displays waveform graphs respectively indicating a time change of a variable value relating to the actual machine time series data and a time change of a variable value relating to the simulation time series data, wherein time axes of the displayed waveform graphs are combined in a side-by-side manner on a screen of the display device and in an overlapping manner on the screen of the display device.

9. A failure prediction support method, executed by an information processing device and comprising:

acquiring actual machine time series data being time series data relating to control of an apparatus and simulation time series data being time series data relating to control of the simulated apparatus;

synchronizing the actual machine time series data and the simulation time series data with each other;

detecting the difference between the synchronized actual machine time series data and simulation time series data; and causing a display device to display a variable value relating to the actual machine time series data and a variable value relating to the simulation time series data in a comparable manner, wherein the comparable manner includes displaying waveform graphs respectively indicating a time change of a variable value relating to the actual machine time series data and a time change of a variable value relating to the simulation time series data, wherein time axes of the displayed waveform graphs are combined in a side-by-side manner on a screen of the display device and in an overlapping manner on the screen of the display device.

10. A non-transitory computer-readable recording medium storing a failure prediction support program for causing a computer to execute:

a procedure for acquiring actual machine time series data being time series data relating to control of an apparatus and simulation time series data being time series data relating to control of the simulated apparatus;

a procedure for synchronizing the actual machine time series data and the simulation time series data with each other;

a procedure for detecting the difference between the synchronized actual machine time series data and simulation time series data; and a procedure for causing a display device to display a variable value relating to the actual machine time series data and a variable value relating to the simulation time series data in a comparable manner, wherein the comparable manner includes displaying waveform graphs respectively indicating a time change of a variable value relating to the actual machine time series data and a time change of a variable value relating to the simulation time series data, wherein time axes of the displayed waveform graphs are combined in a side-by-side manner on a screen of the display device and in an overlapping manner on the screen of the display device.

* * * * *